US010855843B2

(12) United States Patent
Rahman et al.

(10) Patent No.: US 10,855,843 B2
(45) Date of Patent: Dec. 1, 2020

(54) SYSTEMS AND METHODS FOR MONITORING AND REMEDIATING TROUBLE CONDITIONS USING MACHINE LEARNING TECHNIQUES

(71) Applicant: Verizon Patent and Licensing Inc., Arlington, VA (US)

(72) Inventors: Masudur Rahman, Somerset, NJ (US); Bharadwaj Vemuri, Bear, DE (US); Binaben Dipesh Patel, Franklin Park, NJ (US); Isaac Alexander Calvo, Bridgewater, NJ (US); John C. Burlison, Jr., Sherwood, AR (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/270,263

(22) Filed: Feb. 7, 2019

(65) Prior Publication Data

US 2020/0259957 A1    Aug. 13, 2020

(51) Int. Cl.
*H04M 11/00* (2006.01)
*H04M 3/51* (2006.01)
*G06N 20/20* (2019.01)
*H04M 3/42* (2006.01)

(52) U.S. Cl.
CPC .......... *H04M 3/5166* (2013.01); *G06N 20/20* (2019.01); *H04M 3/42059* (2013.01)

(58) Field of Classification Search
CPC . H04M 3/5166; H04M 3/42059; G06N 20/20
USPC .................. 379/88.18, 32.01, 265.01–266.1; 709/204, 224
See application file for complete search history.

(56) References Cited

U.S. PATENT DOCUMENTS

| | | | | |
|---|---|---|---|---|
| 7,281,040 B1 * | 10/2007 | Ly | ........................ | H04M 11/04 709/224 |
| 7,593,936 B2 * | 9/2009 | Hooks | ................ | G06F 11/0793 |
| 8,634,539 B2 * | 1/2014 | Grannan | .......... | H04M 3/42136 379/265.07 |
| 8,804,914 B2 * | 8/2014 | Bajpay | ............... | H04M 3/5166 379/32.01 |
| 2020/0065218 A1 * | 2/2020 | Bhosale | ............... | G06F 11/366 |

* cited by examiner

*Primary Examiner* — Md S Elahee

(57) ABSTRACT

A system described herein may use automated techniques, such as machine learning techniques, to analyze device snapshots from a group of User Equipment ("UEs"), and determine trouble conditions that are experienced by the UEs. The system may identify markers of the trouble conditions based on the snapshots, and may use these markers to predict or identify trouble conditions at other UEs based on snapshots received from the other UEs. Further, once a trouble condition is predicted or identified at the other UEs, the trouble condition may be proactively addressed, without requiring an explicit request from the other UEs to address the trouble condition.

20 Claims, 11 Drawing Sheets

SYSTEMS AND METHODS FOR MONITORING AND REMEDIATING TROUBLE CONDITIONS USING MACHINE LEARNING TECHNIQUES

BACKGROUND

Devices, such as mobile phones, may experience conditions that may cause trouble for users of the devices. For example, installing a particular application (commonly referred to as an "app") on a mobile phone may cause usability issues for several users. In some scenarios, users may contact a call center to obtain support when facing technical issues with their devices. Call centers often use generic interactive voice response ("IVR") systems to handle calls from users.

DETAILED DESCRIPTION OF THE PREFERRED EMBODIMENTS

The following detailed description refers to the accompanying drawings. The same reference numbers in different drawings may identify the same or similar elements.

Figure 1:
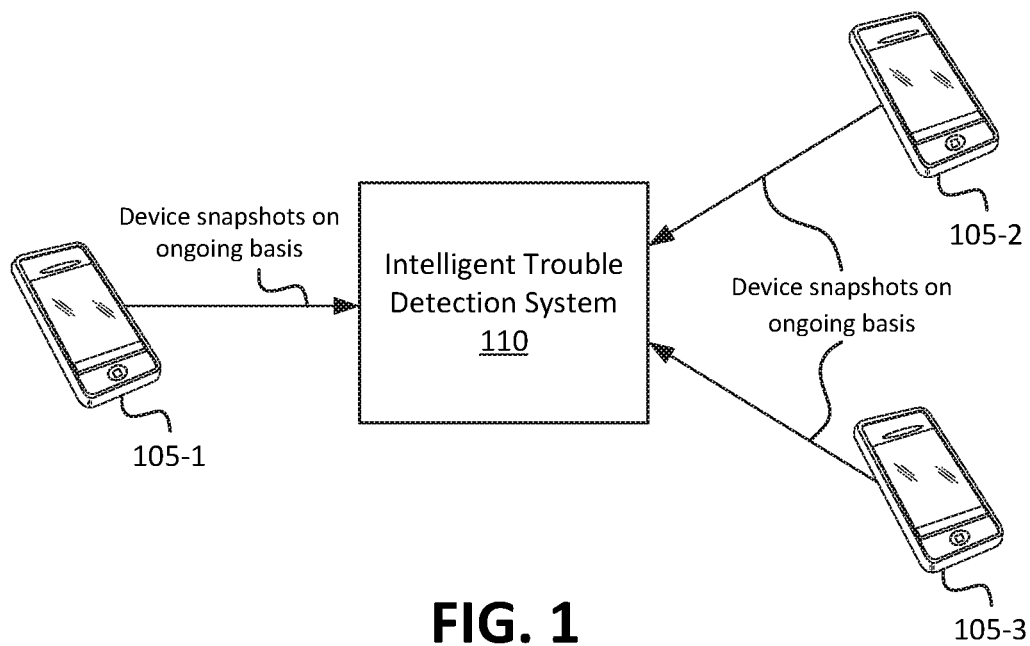
FIGS. 1, 2, 3A, and 3B illustrate an example overview of one or more embodiments described herein.

Embodiments described herein may facilitate the proactive handling of trouble conditions that may be experienced by a device, such as a mobile telephone, a tablet computer, etc. For instance, as shown in FIG. 1, multiple devices 105-1 through 105-3 (sometimes referred to individually as "User Equipment ("UE") 105" or "device 105" or collectively as "UEs 105" or "devices 105") may provide device "snapshots" to Intelligent Trouble Detection System ("ITDS") 110. The snapshots may indicate parameters associated with each device 105 at a given time, and may indicate parameters such as a list of applications currently installed or running at device 105, current network connectivity status of device 105, and/or other parameters. Further details regarding snapshots are discussed below.

As discussed herein, devices 105 may provide snapshots on an ongoing (e.g., periodic and/or intermittent) basis over time, and ITDS 110 may generate one or more models based on the snapshots. These models may be used to detect trends and/or attributes of devices 105 and, as discussed below, trouble markers may be identified. The generation and/or analysis of the models may be performed through one or more machine learning and/or artificial intelligence techniques, such as supervised learning, unsupervised learning, deep learning, Q-learning, anomaly detection, clustering, or the like. Such techniques are referred to herein simply as "machine learning," for the sake of brevity.

Figure 2:
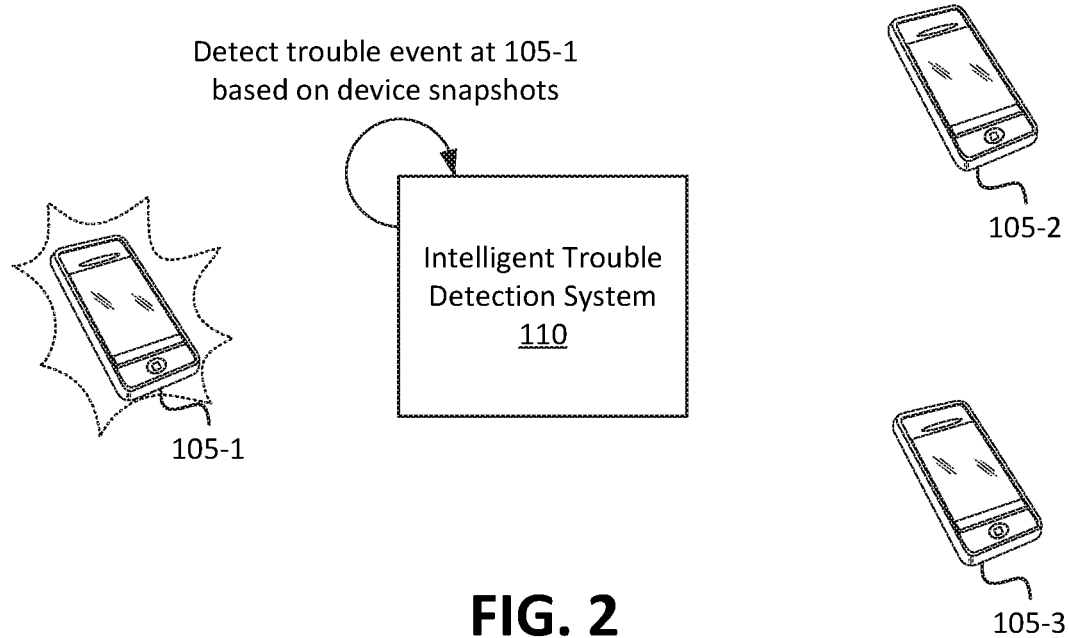

For example, at FIG. 2, ITDS 110 may detect a trouble event at device 105-1 based on the snapshots received from device 105-1. As described herein, snapshots received from one or more other devices (e.g., from device 105-2 and/or device 105-3) may aid in the determination or identification of trouble markers (e.g., attributes of trouble events), which may be used to detect the trouble event at device 105-1. As one example, a trouble event may include the installation of an application that has been proven to be problematic for other users or devices. For instance, based on the snapshots received from devices 105-2 and 105-3, ITDS 110 may detect that devices 105-2 and 105-3 have a particular application installed, and have faced problems with that application (e.g., have called technical support, uninstalled the application, used the application less than an expected amount, etc.). Further, based on the device snapshot(s) from device 105-1, ITDS 110 may detect that device 105-1 has installed the same application that has caused issues at devices 105-2 and 105-3.

Figure 3A:
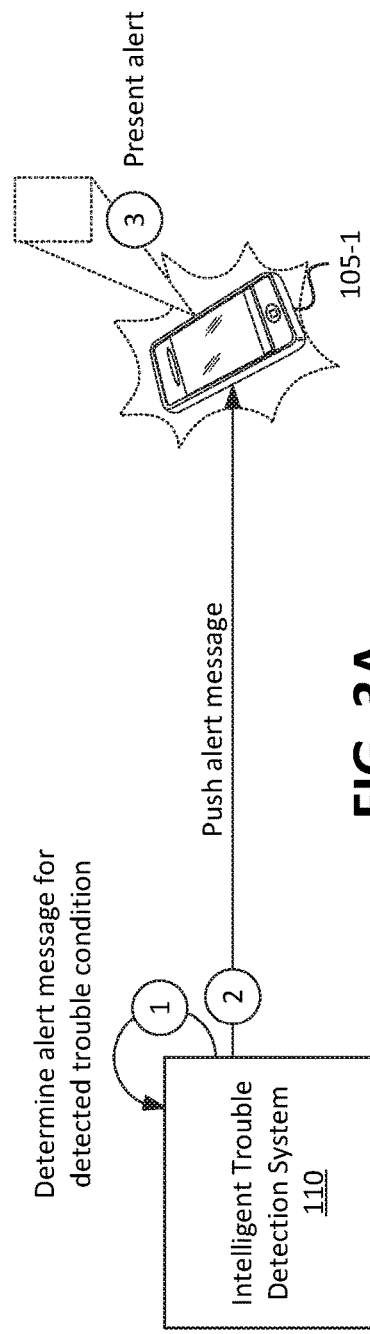

ITDS 110 may, in some embodiments, perform or facilitate remediation measures based on detecting the trouble event at device 105-1. For instance, as shown in FIG. 3A, ITDS 110 may determine (at arrow "1") an alert message to send to user device 105-1 based on the detected trouble condition. In some embodiments, the alert message may be automatically determined based on a machine learning analysis that may indicate, for example, how the same trouble condition was previously remediated or otherwise handled. For instance, in the example of a problematic application installed at devices 105-2 and 105-3, the application may have been removed by users of devices 105-2 and 105-3, and this removal may be reported to ITDS 110 by way of one or more snapshots from devices 105-2 and 105-3. ITDS 110 may thus, in this scenario, determine that the alert message for this particular trouble condition (i.e., the installation of the particular application, in this example) should indicate that the application should be uninstalled from a device 105 that installs the application (i.e., device 105-1, in this example). In some embodiments, the alert may be, or may include, instructions to be executed by device 105-1 (e.g., machine-executable instructions, code, or pseudo code, which may instruct device 105-1 to delete the application, modify presentation of the application (e.g., present a warning indicator proximate to a selectable icon on a home screen of device 105-1 that launches the application when selected), or the like).

ITDS 110 may "push" (at arrow "2") the alert message to device 105-1. The alert message may be "pushed" inasmuch as ITDS 110 may output the alert message to device 105-1 without any specific instructions or request from device 105-1 for the alert message. In some embodiments, the alert message may be sent via one or more over-the-top ("OTT") messages, Short Message Service ("SMS") messages, emails, and/or any other suitable messaging technique.

Device 105-1 may present (at arrow "3") the alert message, such as via a pop-up alert, an incoming email, an incoming SMS message, or the like. Additionally, or alternatively, as mentioned above, the alert message may include instructions for device 105-1 to perform one or more functions (e.g., deleting the application, and/or some other function). In such scenarios, device 105-1 may perform the instructed functions specified in the alert message.

In this manner, a user of device 105-1 may be proactively informed that the particular application, which was recently installed or updated at device 105-1, may be problematic. The proactive alert may thus save the user potential frustration, troubleshooting, or other inconvenience that may have otherwise been caused by allowing the particular application to remain installed at device 105-1.

Figure 3B:
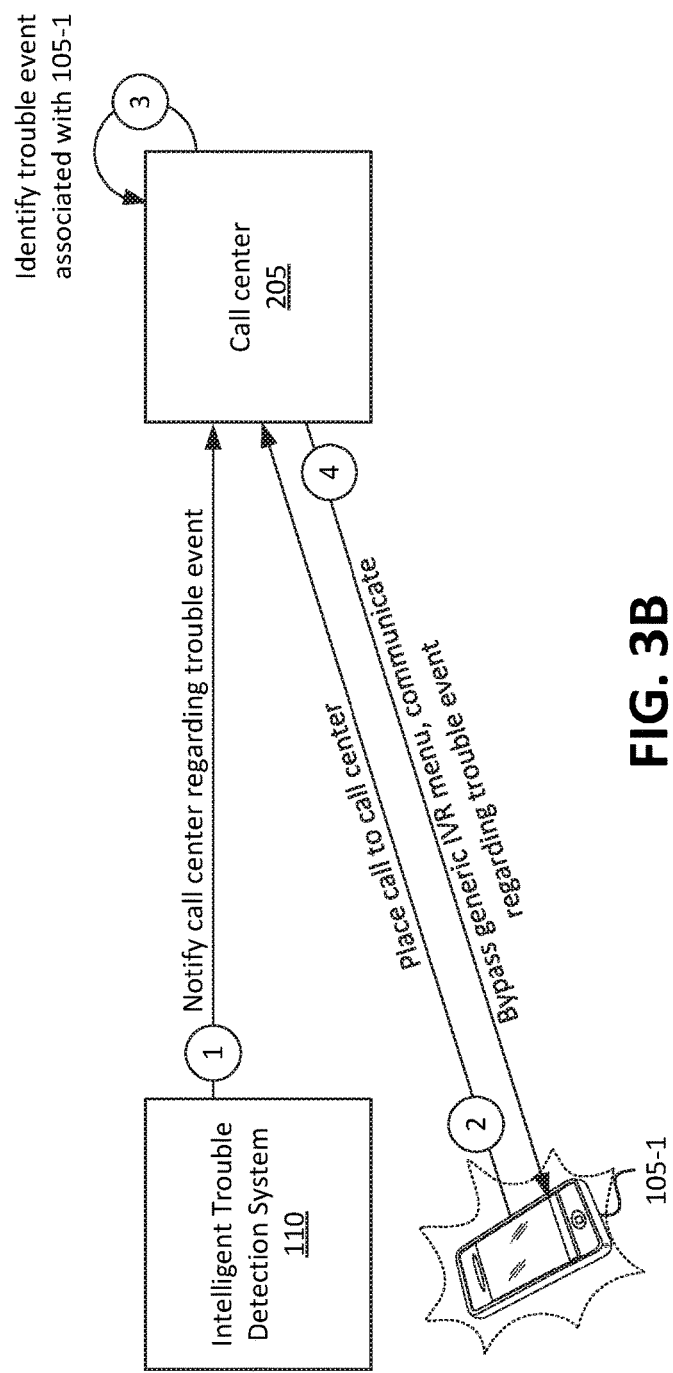

In addition to, or in lieu of, alerting device 105-1 regarding the trouble condition (e.g., as shown in FIG. 3A), ITDS 110 may facilitate the proactive handling of customer service calls (e.g., calls to a call center) regarding the trouble condition. For instance, referring to FIG. 3B, ITDS may notify (at arrow "1") call center 205 regarding a detected trouble event. As discussed in greater detail below, the notification may include an identification of the trouble event (e.g., the recent installation or update of a particular application, continuing with the above example), as well as an identification of device 105-1 (e.g., a Mobile Directory Number ("MDN") associated with device 105-1, and/or some other suitable identifier).

Some time later (e.g., one minute, one hour, one week, etc.), a call may be placed (at arrow "2") by device 105-1 to call center 205. For example, a user of device 105-1 may be facing technical issues with the application with which the trouble event is associated, and may place a call to call center 205 to obtain technical support. Call center 205 may identify (at arrow "3") the trouble event associated with device 105-1 (e.g., based on the notification previously provided by ITDS 110). In some embodiments, call center 205 may additionally identify a way to handle the call that is specific to the trouble event. For example, in scenarios where call center 205 implements an IVR system, call center 205 may bypass some or all of a generic IVR menu that would otherwise be presented in the absence of a notification of a trouble event.

For example, in some embodiments, call center 205 may proactively select one or more options based on the notification of the trouble event (e.g., may automatically select a first option "Press 1 for technical support" and a second option that would be presented after the first option is selected (e.g., "Press 1 if you're having trouble with an application you installed")). In this manner, multiple button presses, along with the time that would be required to navigate the IVR menu, may be saved for the user, thus enhancing the user's experience and providing a solution faster. In some embodiments, the IVR menu may be bypassed entirely, and a live customer support representative may instead be selected (e.g., an application support specialist may be selected as opposed to a billing specialist or some other type of customer support representative). In some embodiments, the selected representative may be notified of details regarding device 105-1 and/or the specific trouble condition, thus further preparing the representative to handle the issue without requiring the user to spend time and effort explaining the issue.

Figure 4:
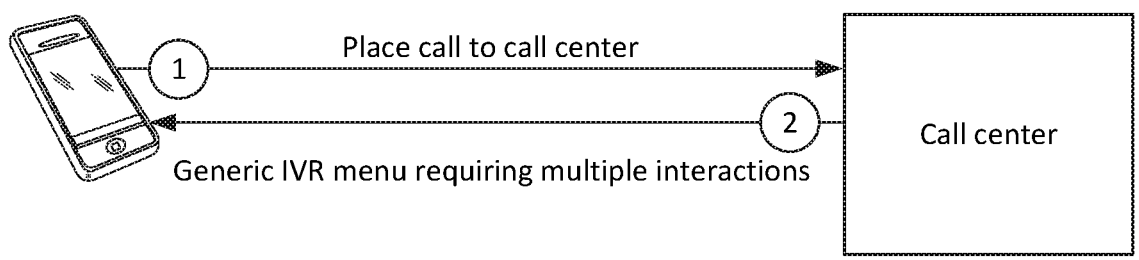
FIG. 4 illustrates scenario in which a call is placed to a call center and a generic IVR menu is presented.

FIG. 4 illustrates an example of how a call center may interact with a device in the absence of the above-discussed notification of a trouble event (e.g., as discussed above with respect to FIG. 3B). Assume, for instance, that a call is placed (at arrow "1") to a call center. The call center may present (at arrow "2") a generic IVR menu, which may require multiple interactions, and substantial time, for a user to eventually choose a menu option that may or may not accurately describe the issue they are facing. Additionally, if the user eventually reaches a live person, the live person would not necessarily have any information regarding the issue, and thus may need to be newly apprised of the details of the issue, which may take substantial time for the user to explain, and/or which may be beyond the user's technical capabilities.

Figure 5:
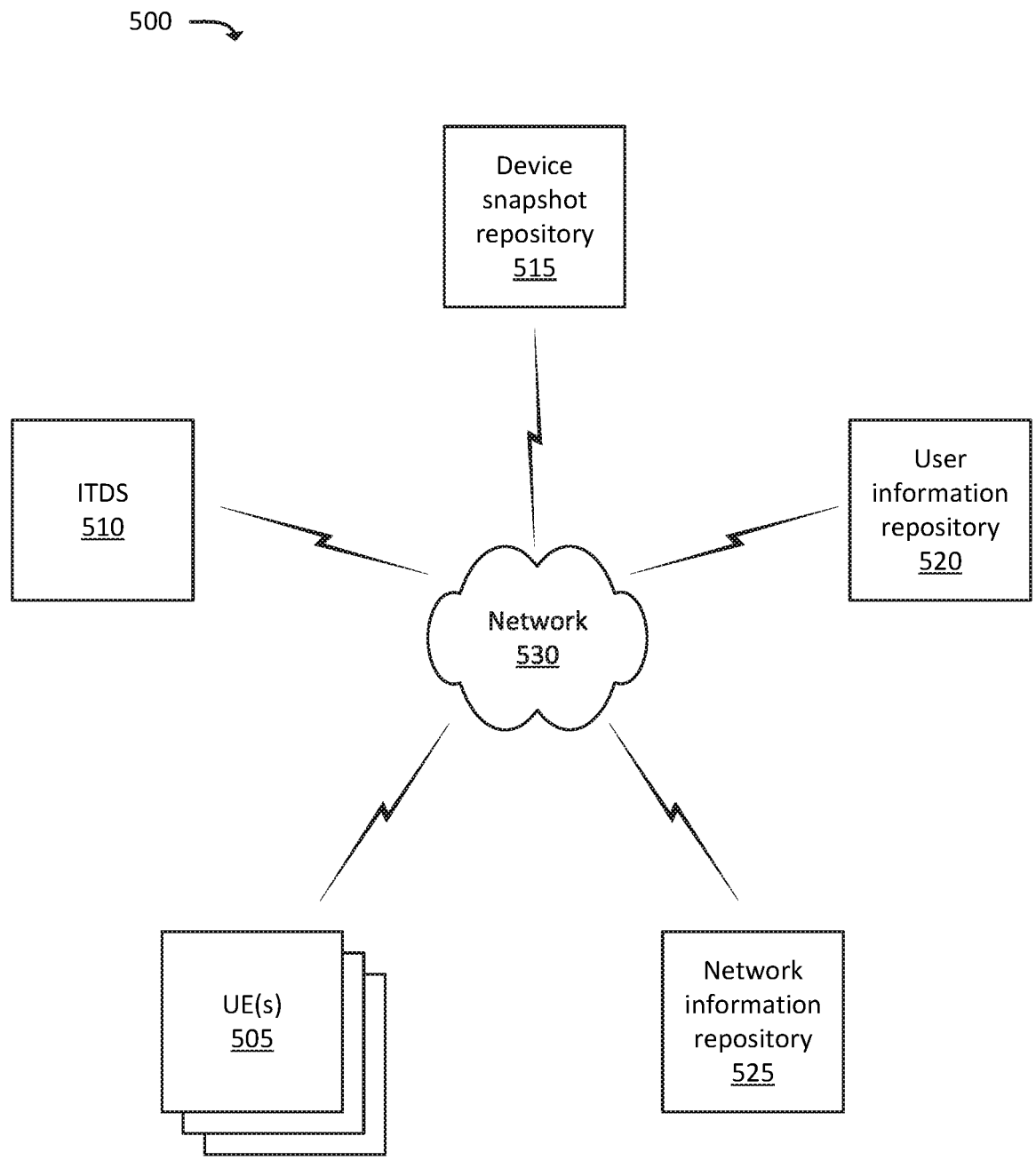
FIG. 5 illustrates an example environment in which one or more embodiments, described herein, may be implemented.

FIG. 5 illustrates an example environment 500, in which one or more embodiments, described herein, may be implemented. As shown in FIG. 5, environment 500 may include one or more UEs 505, ITDS 510, device snapshot repository 515, user information repository 520, network information repository 525, and network 530. The quantity of devices and/or networks, illustrated in FIG. 5, is provided for explanatory purposes only. In practice, environment 500 may include additional devices and/or networks; fewer devices and/or networks; different devices and/or networks; or differently arranged devices and/or networks than illustrated in FIG. 5. For example, while not shown, environment 500 may include devices that facilitate or enable communication between various components shown in environment 500, such as routers, modems, gateways, switches, hubs, etc. Alternatively, or additionally, one or more of the devices of environment 500 may perform one or more functions described as being performed by another one or more of the devices of environment 500. Devices of environment 500 may interconnect with each other and/or other devices via wired connections, wireless connections, or a combination of wired and wireless connections. In some implementations, one or more devices of environment 500 may be physically integrated in, and/or may be physically attached to, one or more other devices of environment 500.

UE 505 may include any computation and communication device that is capable of communicating with one or more networks (e.g., network 530). For example, UE 505 may include a device that receives content, such as web pages (e.g., that include text content and/or image content), streaming audio and/or video content, and/or other content, via an Internet connection and/or via some other delivery technique. UE 505 may also receive user interactions (e.g., voice input, touches on a touchscreen, "clicks" via an input device such as a mouse, etc.). In some implementations, UE 505 may be, or may include, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

ITDS 510 may include one or more devices (e.g., a server device or a distributed set of devices, such as a cloud computing system) that perform one or more actions described herein. For example, ITDS 510 may proactively detect trouble conditions at one or more UEs 505, as described herein. In some embodiments, ITDS 510 may proactively remediate, and/or facilitate the remediation of, detected trouble conditions, as described in greater detail herein.

Device snapshot repository 515 may include one or more devices (e.g., a server device or a distributed set of devices, such as a cloud computing system) that perform one or more actions described herein. For example, device snapshot repository 515 may receive device snapshots from UEs 505, store the snapshots, and/or provide the snapshots to ITDS 510 for processing in accordance with embodiments described herein.

User information repository 520 may include one or more devices (e.g., a server device or a distributed set of devices, such as a cloud computing system) that perform one or more actions described herein. For example, user information repository 520 may store information regarding one or more users or UEs 505, such as demographics information, information indicating a type of voice or data subscription associated with a user or UE 505, and/or other suitable information. In some embodiments, user information repository 520 may be, may include, and/or may communicatively coupled with a Home Subscriber Server ("HSS"), or similar device, of a Long-Term Evolution ("LTE") network. In some embodiments, user information repository 520 may be, may include, and/or may be communicatively coupled with a Unified Data Management ("UDM") function, or other similar function, of a Fifth Generation ("5G") network.

Network information repository 525 may include one or more devices (e.g., a server device or a distributed set of devices, such as a cloud computing system) that perform one or more actions described herein. For example, network information repository 525 may determine and/or receive information regarding a status or performance of network 530. For example, network information repository 525 may determine and/or receive metrics related to network load and/or capacity, throughput, latency, or the like.

Network 530 may include one or more radio access networks ("RANs"), via which UEs 505 may access one or more other networks or devices, a core network of a wireless telecommunications network, an IP-based packet data network ("PDN"), a wide area network ("WAN") such as the Internet, a private enterprise network, and/or one or more other networks. In some implementations, network 530 may be, include, or be in communication with a cellular network, such as an LTE network, a Third Generation ("3G") network, a Fourth Generation ("4G") network, a 5G network, a Code Division Multiple Access ("CDMA") network, etc. UE 505 may connect to, and/or otherwise communicate with, via network 530, data servers, application servers, other UEs 505, etc. Network 530 may be connected to, and/or otherwise in communication with, one or more other networks, such as a public switched telephone network ("PSTN"), a public land mobile network ("PLMN"), and/or another network.

Figure 6:
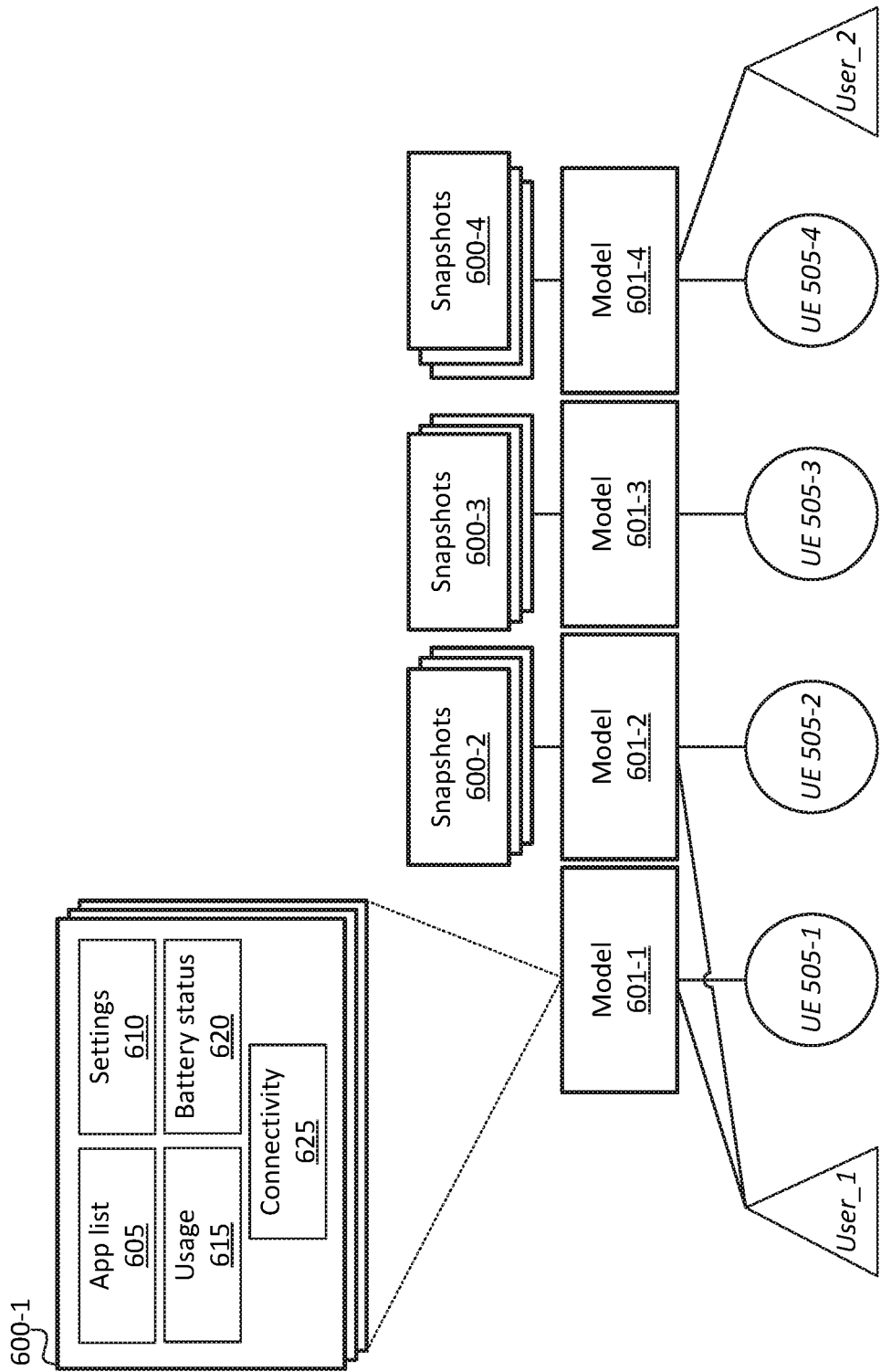
FIG. 6 illustrates a conceptual example of how snapshots, models, devices, and users may be arranged.

FIG. 6 illustrates an example conceptual arrangement of snapshots 600 and models 601. As discussed below, a particular model 601 may be associated with a particular device (e.g., UE 505), a set of devices, a particular user, and/or a set of users. A given model 601 may be generated based on one or more snapshots 600. A particular snapshot 600 may include parameters and/or other information of a particular UE 505 as of a particular time. For example, a first snapshot 600 for a particular UE 505 may include a first set of parameters associated with the particular UE 505 at a first time (e.g., 12:00 PM) while a second snapshot 600 for the same UE 505 may include a second set of parameters associated with the particular UE 505 at a second time (e.g., 1:00 PM).

An example of a particular snapshot 600-1 is shown in in FIG. 6. In this example, snapshot 600-1 may be associated with UE 505-1 (e.g., may include parameters or other information associated with UE 505-1, as opposed to other UEs 505-2, 505-3, etc.). As shown, snapshot 600-1 may include application list 605, settings 610, usage 615, battery status 620, and connectivity information 625 associated with UE 505-1. In some embodiments, snapshot 600-1 may include additional, fewer, and/or different types of information.

A given snapshot 600 may indicate parameters of a given UE 505 at a particular point in time. For example, a first snapshot 600, associated with UE 505, may include an application list 605, which lists applications that are installed on UE 505 at a first point in time, while a second snapshot 600, associated with the same UE 505, may indicate a different application list 605, which lists a different set of applications that are installed on UE 505 at another point in time (e.g., where the difference may be the result of installing and/or uninstalling applications at UE 505). In some embodiments, a set of snapshots 600 may be associated with a single UE 505. In this sense, the UE 505 itself may be modeled (e.g., trends may be identified with respect to the activity, usage, and/or other parameters or attributes of UE 505).

The content of snapshots 600, associated with a particular UE 505, may only include information, or may only include types of information, that have been collected in accordance with express authorization by a user of UE 505. Furthermore, any or all information associated with the user or with UE 505 may be examined by, and deleted upon a request from, the user.

Application list 605 may indicate a set of applications that are currently installed at UE 505. Application list 605 may include names, identifiers, and/or other suitable information that can be used to uniquely identify different applications. In some embodiments, application list 605 may include other information regarding applications, such as install date of an application, total usage time of the application, usage time of the application over a particular time window, a measure of processing resources consumed by the application when running in focus and/or when running as a background process, an amount of data sent and/or received by the application, a quantity of messages sent and/or received by the application, a deletion date/time (e.g., in the case of an application that has been deleted but for which a record is retained), and/or other suitable information.

Settings 610 may include user-accessible settings (e.g., which may be specified by selecting a "Settings" option on UE 505). For instance, settings 610 may include language settings, audio output settings (e.g., call volume, media volume, speakerphone/earphone preference, etc.), "do not disturb" settings, screen brightness, ringtones, and/or other types of settings.

Usage information 615 may include information indicating a usage of UE 505. For example, usage information 615 may indicate an amount of time that UE 505 was in an unlocked state or a locked state, an amount of data that was sent by or received from UE 505, a total duration of voice calls made via UE 505, a browsing history of UE 505 (e.g., websites visited via a web browser or some other application), an identification of callees of calls placed by UE 505, an identification of callers that called UE 505, or the like.

Battery status 620 may include information regarding a battery of UE 505. For example, battery status 620 may indicate a charge level of a battery of UE 505, an estimated amount of time remaining on a current charge level of the battery, an amount of time since the battery was last fully charged, a battery "health" (e.g., a current total capacity as compared to an expected capacity of a "new" or "healthy" battery), and/or other battery-related information.

Connectivity information 625 may include information regarding types of network connectivity associated with UE 505. For example, connectivity information 625 may specify types of radio access technologies ("RATs") with which UE 505 is capable of communicating (e.g., 4G, 5G, WiFi, etc.), types of RATs to which UE 505 is currently connected and/or sending or receiving traffic at the time of the snapshot, how long UE 505 has been connected to a given RAT, a time at which UE 505 connected to a given RAT, carrier settings (e.g., settings that have been installed on UE 505 by a wireless telecommunications network provider), and/or other connectivity-related information.

As further shown in FIG. 6, model 601-1 may be based on multiple (e.g., dozens, hundreds, thousands, etc.) of snapshots 600-1, where each snapshot 600-1 represents parameters (e.g., some or all of the parameters discussed immediately above) of UE 505-1 at different times. Model 601-1 may be generated using machine learning techniques, and may reflect trends (and/or other descriptive attributes) associated with UE 505-1 or a user of UE 505-1 (e.g., User_1, in this example).

For example, a particular model 601-1 may be based on a set of snapshots 600-1 associated with UE 505-1. Based on, for instance, application lists 605 in the set of snapshots 600-1, model 601-1 may indicate that a particular application was installed at UE 505-1 at a certain time (e.g., by examining the differences between the application lists 605 of various snapshots 600-1). Furthermore, based on usage information 615, model 601-1 may indicate that significantly more data traffic was uploaded from UE 505-1 than was uploaded before the particular application was installed at UE 505-1. Furthermore, based on connectivity information 615, model 601-1 may indicate that UE 505-1 dropped searched for a wireless telecommunications network more frequently after the application was installed than before (which may indicate connectivity issues at UE 505-1). As yet another example, based on battery status information 620, model 601-1 may indicate that the battery of UE 505-1 was discharged significantly more rapidly after the application was installed than before the application was installed.

In some embodiments, machine learning and/or similar techniques may be used to determine that the significant discharge of the battery was caused by (or was likely to be caused by) the installation of the application. For example, models 601 of other UEs 505 may also show similar attributes (e.g., rapid battery discharge after installation of the application), and thus it may be determined or inferred that installation of the application caused the rapid discharge of the battery at those UEs 505, and/or may be used to predict the rapid discharge of the battery of another UE 505 that has recently installed the application (e.g., without receiving a snapshot, indicating rapid battery discharge, from the UE 505 that has recently installed the application).

Similarly, models 601-2, 601-3, and 601-4 may be based on sets of snapshots 600-2, 600-3, and 600-4, received from UEs 505-2, 505-3, and 505-4, respectively. Models 601 may, in some embodiments, be based on information in addition to snapshots 600. For example, models 601 may further be based on information received from network information repository 525 and/or other sources. For instance, network information repository 525 may indicate network conditions of one or more wireless telecommunications networks. The network conditions may include, for instance, conditions of one or more radio access networks ("RANs") (e.g., relative network load as compared to capacity, quantity or proportion of available physical resources blocks ("PRBs"), channel quality indicators (e.g., signal to interference and noise ratio ("SINR"), signal strength, etc.), and/or other measures or indicators of network condition). Models 601 may further be based on additional sources of information, such as call center transcripts, customer service emails, and/or other types of information that may be collected (i.e., with express user consent).

As described below, models 601 of multiple UEs 505 may be aggregated and analyzed to determine trends and/or attributes of identifiable clusters of modeled attributes. For instance, a group of models 601 may be analyzed to identify that a group of UEs 505 installed or updated the same application within the same week, that customer service calls were placed from the UEs 505 of the group within two days of installing the application, that call transcripts of the calls included at least one mention of the name of the application, and that the application was uninstalled within one hour of ending the customer service call. In this example situation, it may be inferred that installing or updating the application is a trouble condition, and that remediation should be performed for future UEs 505 that install or update the application. As discussed below, remediation may include, for example, notifying UE 505 that the application may cause issues, isolating the application on UE 505 (e.g., preventing the application from accessing memory or storage of UE 505, and/or preventing the application from making operating system- or kernel-level application programming interface ("API") calls) until action can be taken, notifying customer service (e.g., a telephone call center, a text-based customer support center, etc.) that the UE 505 has installed the application, notifying an application developer that the application may cause issues, and/or notifying a publisher of the application (e.g., an owner or operator of an application "storefront") that the application may cause issues. In this sense, the trouble condition can be proactively addressed, without waiting for a user of UE 505 to experience the issue firsthand.

The above examples are a small sampling of the types of information or attributes that can be indicated by models 601. In practice, any suitable type of modeling can be performed (e.g., using machine learning techniques and/or other suitable techniques) to determine or indicate trends, attributes, and/or other descriptors of UEs 505 and/or users.

In some embodiments, multiple models 601, associated with multiple UEs 505, may be associated with a single user. For example, a user may be associated with multiple UEs 505 (e.g., a mobile telephone, a tablet computer, a desktop computer, an Internet of Things ("IoT") device, etc.). Information associating the user with multiple UEs 505 may be received from a device associated with a wireless telecommunications network, such as a Home Subscriber Server ("HSS"), a Unified Data Management ("UDM") component, and/or some other information source (e.g., user information repository 520). ITDS 510 may use this information to associate models 601, associated with UEs 505 that are associated with the same user, with that user. In this sense, a given user may be associated with a model that is itself based on multiple models 601.

Associating a user with multiple models 601 and/or UEs 505 may be useful to provide a seamless user experience across multiple devices. For instance, if a user's tablet computer is malfunctioning due to installing a given application, it may be useful to notify the user via one or more other devices (e.g., a mobile telephone) that the given application may cause issues if installed on one of the user's other devices. Additionally, user behavior across multiple devices may itself be indicative of a trouble condition. For example, if a user installs a particular application on multiple devices and then contacts a technical support representative, then it may be inferred that the user is requesting support for the particular application.

Figure 7:
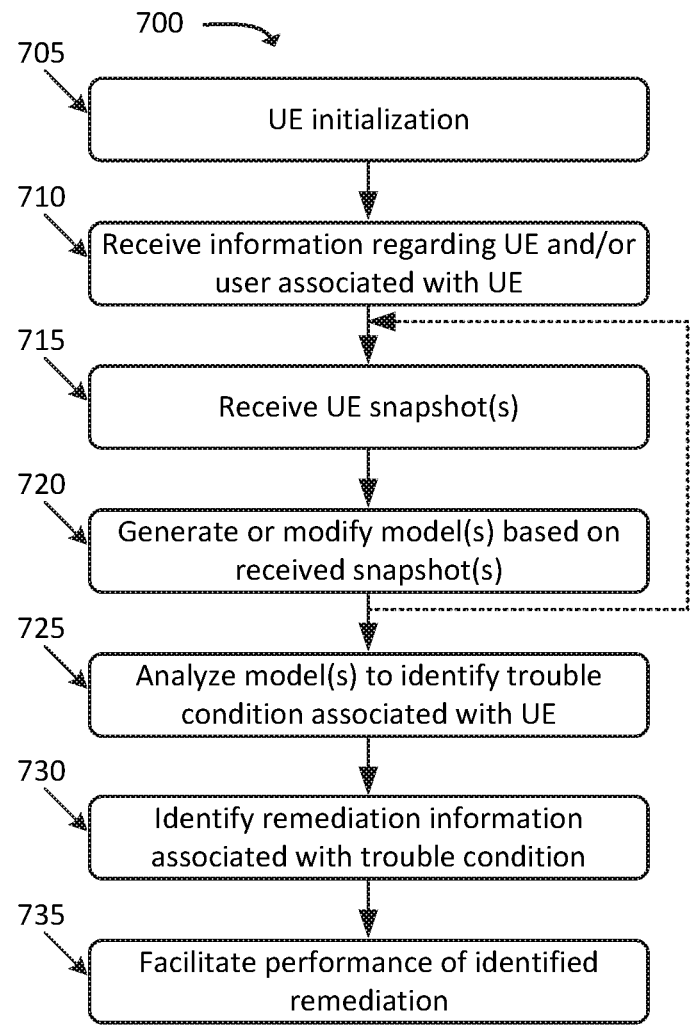
FIG. 7 illustrates an example process for proactively identifying trouble conditions associated with a particular device.

FIG. 7 illustrates an example process 700 for detecting and remediating trouble conditions at a UE based on UE snapshots. In some embodiments, some or all of process 700 may be performed by ITDS 510. In some embodiments, one or more other devices (e.g., device snapshot repository 515, user information repository 520, network information repository 525) may perform some or all of process 700, and/or may perform some or all of process 700 in concert with ITDS 510.

As shown, process 700 may include (at 705) a UE initialization process. For example, a particular UE 505 may be registered and/or provisioned with a wireless telecommunications network, such as when UE 505 is purchased by a user, when UE 505 connects to the wireless telecommunications network, etc. In some embodiments, UE 505 may be registered with ITDS 510, such as through a registration process performed by a user of UE 505 and/or through a registration process performed by an owner and/or operator of the wireless telecommunications network. ITDS 510 may receive an identifier of UE 505, such as an International Mobile Station Equipment Identity ("IMEI") value, International Mobile Subscriber Identity ("IMSI") value, MDN, and/or some other identifier.

Process 700 may further include receiving (at 710) information regarding the UE and/or a user associated with the UE. For example, ITDS 510 may receive identifying and/or descriptive information regarding a user of UE 505 from user information repository 520. For instance, ITDS 510 may receive, from user information repository 520, a name of the user, address, demographics information, telephone number, email address, and/or other information associated with the user.

ITDS 510 may receive, in some embodiments, information describing attributes of UE 505 (e.g., from UE 505, from network information repository 525, and/or from some other device or system). The attributes of UE 505 may include information such as a make, model, screen size, display resolution, processor type, amount of random access memory ("RAM"), storage capacity, identifying information (e.g., IMEI, IMSI, MDN, IP address, and/or some other unique identifier that differentiates from other UEs 505), and/or other attributes.

Process 700 may additionally include receiving (at 715) UE snapshots. For example, ITDS 510 may receive snapshots, associated with UE 505, from UE 505, device snapshot repository 515, and/or some other device or system. As discussed above, the snapshots may include information that describes a current operating state of UE 505, and may include some or all of the types of information discussed above with respect to FIG. 6. In some embodiments, the snapshots may include different, or less, information than discussed in FIG. 6. In some embodiments, the snapshots may only indicate changes (e.g., a snapshot taken at a given time may indicate only that a particular application has been uninstalled since the immediately preceding snapshot was generated). As discussed below (e.g., with respect to FIG. 9), UE 505 may generate and/or output snapshots on a period or intermittent basis. Further, as discussed in further detail below, UE 505 may generate and/or output snapshots on a triggered basis, in which the satisfaction of certain trigger criteria may cause UE 505 to generate and/or output a snapshot.

Briefly, as one example, if a particular application has been previously identified as potentially causing issues, a trigger may include criteria that is satisfied when that particular application is installed at UE 505. Thus, when that particular application is installed at UE 505, UE 505 may generate and/or output a snapshot based on the satisfaction of the trigger criteria. As another example, if updating the particular application has been previously identified as potentially causing issues, a trigger may include criteria that is satisfied when that particular application is updated at UE 505. For example, if a recent update has introduced bugs or other flaws that cause issues, updating the application to the most recent version may be a trouble condition. Thus, when that particular application is updated at UE 505, UE 505 may generate and/or output a snapshot based on the satisfaction of the trigger criteria.

As yet another example, an initial setup or provisioning process may be criteria of a trigger based on which a snapshot is generated by UE 505. For example, when UE 505 is first powered on (e.g., when UE 505 is first powered on after being set, or reset, to a default, new, "factory," etc. state) or is initially provisioned on a wireless telecommunications network, UE 505 may generate and/or output a snapshot. As another example, when UE 505 is reset to a default or factory state (e.g., when a selection is received from a user of UE 505 to reset UE 505 to default factory settings), UE 505 may generate and/or output a snapshot after receiving the selection to reset UE 505 to the default state, but prior to actually resetting UE 505 to the default state.

Process 700 may also include generating and/or modifying (at 720) one or more models based on the received snapshots. For example, as described above with respect to FIG. 6, ITDS 510 may utilize any suitable technique, including one or more machine learning techniques, to generate a model 601 based on attributes of UE 505, and/or changes in attributes of UE 505 (e.g., where the attributes are included in, or derived from, the received snapshots). In situations where a model already exists for UE 505 and/or the user of UE 505, ITDS 510 may modify (e.g., refine) the model based on the received snapshots. For example, the existing model may be based on one or more previously received snapshots, and can be modified based on presently or subsequently received snapshots.

Process 700 may further include analyzing (at 725) the model(s) to identify a trouble condition associated with the UE. For example, ITDS 510 may compare some or all of the attributes, in the snapshot(s) received from UE 505, to parameters or indicators (e.g., trouble markers) of a given trouble condition. As discussed herein, a "trouble marker" may be an attribute, or set of attributes, that indicate that a particular trouble condition is (or may potentially be) present at, or is likely to become present imminently, at a particular device (e.g., UE 505). In some embodiments, ITDS 510 may compare attributes associated with one or more other UEs 505, and/or a user associated with UE 505, to parameters or indicators of a given trouble condition. For example, as mentioned above, a model may include attributes of, and/or may describe, multiple UEs 505 (e.g., multiple UEs 505 that are owned and/or operated by the same user).

In some embodiments, ITDS 510 may also detect indicators of trouble conditions by analyzing models associated with a variety of different UEs 505 and/or users. For example, as discussed above, a particular trouble condition may cause users to contact technical support regarding a particular application. Continuing with the example of an application that may cause issues, the indicators of the trouble condition may include, but may not be limited to, the installation of the particular application at multiple UEs 505, the mention of the name of the application during calls to customer support after the installation of the application, the rapid depletion of batteries of UEs 505 after the installation of the application, and/or other indicators. That is, ITDS 510 may detect these indicators using machine learning and/or some other suitable techniques (e.g., where these indicators are able to be used to infer UEs 505 that exhibit the trouble condition, versus other UEs 505 that do not exhibit the trouble condition).

Process 700 may additionally include identifying (at 730) remediation information associated with the trouble condition. For example, ITDS 510 may identify one or more actions to take based on the identified trouble condition. Continuing with the example of a particular application that may cause issues, the action may include notifying UE 505, which has just installed the particular application, that the application should be uninstalled, and/or some other notification associated with the application. In some embodiments, the action may include notifying another device or system, such as a developer of the application and/or a customer service call center that fields calls for the application and/or from UE 505.

The remediation information may be identified (e.g., automatically) by ITDS 510 by using machine learning and/or other suitable techniques. For example, ITDS 510 may identify (e.g., based on snapshots and/or models associated with multiple UEs 505 and/or users) actions that were taken after the trouble condition was identified at other UEs 505. For example, ITDS 510 may identify that the application was uninstalled, that certain settings were changed at UE 505 and/or within the application, or some other actions were taken. ITDS 510 may further determine that the indicators, which indicate the problem condition, are no longer present after the remedial action has been taken, which would further confirm that the remedial action was determined correctly. For example, if the particular application causes the battery of a UE 505 to discharge more rapidly than when the application was not installed, and then the application is subsequently uninstalled, the battery may resume discharging at a "normal" rate (e.g., similar to the rate of discharge before the particular application was installed).

Process 700 may also include facilitating (at 735) performance of the identified remediation. For example, ITDS 510 may communicate with UE 505, a call center, and/or some other device or system to provide instructions, notifications, and/or other information that can be used to perform the identified remediation.

Figure 8:
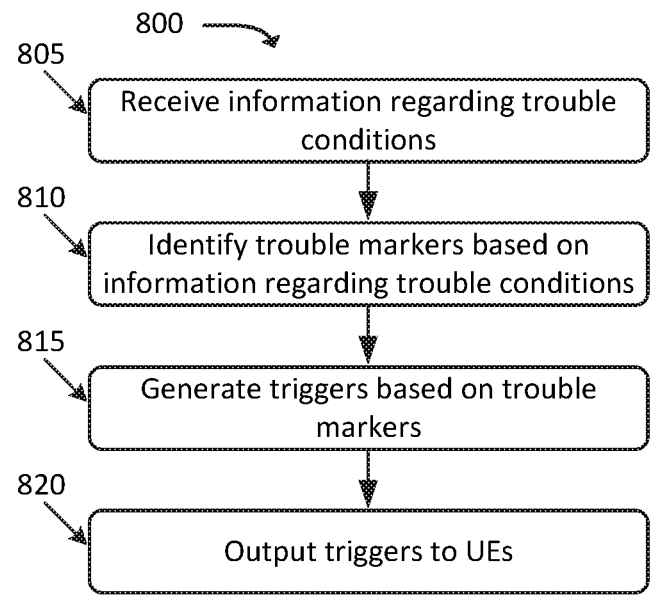
FIG. 8 illustrates an example process for generating triggers based on trouble markers identified based on trouble conditions associated with one or more devices.

FIG. 8 illustrates an example process 800 for generating triggers based on trouble condition markers. As discussed below with respect to FIG. 9, these triggers may be used by UEs 505 to generate and/or output snapshots when the criteria of a trigger are met. In some embodiments, some or all of process 800 may be performed by ITDS 510. In some embodiments, one or more other devices (e.g., device snapshot repository 515, user information repository 520, network information repository 525) may perform some or all of process 800, and/or may perform some or all of process 800 in concert with ITDS 510.

As shown, process 800 may include receiving (at 805) information regarding trouble conditions. For example, ITDS 510 may receive information specifying a particular trouble condition, such as an application that, when installed at UEs 505, causes one or more issues at UEs 505. The information regarding the trouble conditions may include snapshots of UEs 505. The information regarding the trouble conditions may additionally, or alternatively, include information regarding respective users of UEs 505 (e.g., as obtained or received from user information repository 520), information regarding network 550 (e.g., as obtained or received from network information repository 525), and/or other information that may be suitable to identify trouble markers associated with the trouble condition. Examples of the types of information that may be obtained or received from user information repository 520 and/or network information repository 525 are discussed above with respect to FIG. 7.

Process 800 may further include identifying (at 810) one or more trouble markers based on the information regarding the trouble conditions. For example, ITDS 510 may analyze the information regarding the trouble conditions (received at 805) to identify patterns, trends, and/or other identifiable predictors of the trouble conditions. For example, ITDS 510 may use artificial intelligence, machine learning, statistical analysis, and/or some other suitable technique to identify these patterns, trends, and/or other identifiable predictors.

Assume, for example, that a relatively large quantity of snapshots from a first set of UEs 505 indicate that a particular application has been installed at a particular device type (e.g., multiple users of a mobile phone of the same make and model have installed the same application), and that users of those devices have contacted a customer support center and have mentioned the name of the application. Assume further that a relatively large quantity of snapshots from a second set of UEs 505, of different device types, indicate that the particular application has been installed, but no information indicates that the users of these UEs 505 have contacted a customer support center and/or have mentioned the name of the application to a customer support center. That is, the UEs 505 of the second set may have not experienced the same issue as the UEs 505 of the first set. In this example scenario, ITDS 510 may determine that a trouble marker may consist of the particular application being installed by the device type (e.g., the make and/or model) of the UEs 505 of the first set. In this manner, the trouble marker may not include the same application being installed by other device types, as the installation of the application at other device types may not have resulted in a customer support call.

Process 800 may additionally include generating (at 815) one or more triggers based on the identified trouble markers. For example, ITDS 510 may generate a trigger, which may specify one or more conditions based on the identified trouble markers. For example, continuing with the above example, ITDS 510 may generate a trigger that is satisfied when the particular application is installed by the device type of the UEs 505 of the first set.

Process 800 may also include outputting (at 820) the trigger(s) to one or more UEs. For example, ITDS 510 may "push" the trigger to some or all UEs 505 with which ITDS 510 is capable of communicating, and/or is authorized to communicate. In some embodiments, ITDS 510 may output the trigger only to UEs 505 that may at some point be capable of satisfying the trigger. For example, ITDS 510 may output the trigger only to UEs 505 that are of a same device type as indicated in the trigger, only to UEs 505 that are located within (or within a threshold distance of) a geographical location specified in the trigger, only to UEs 505 that have physical attributes or capabilities (e.g., screen size, overall size, camera resolution, weight, etc.) specified in the trigger, etc.

Figure 9:
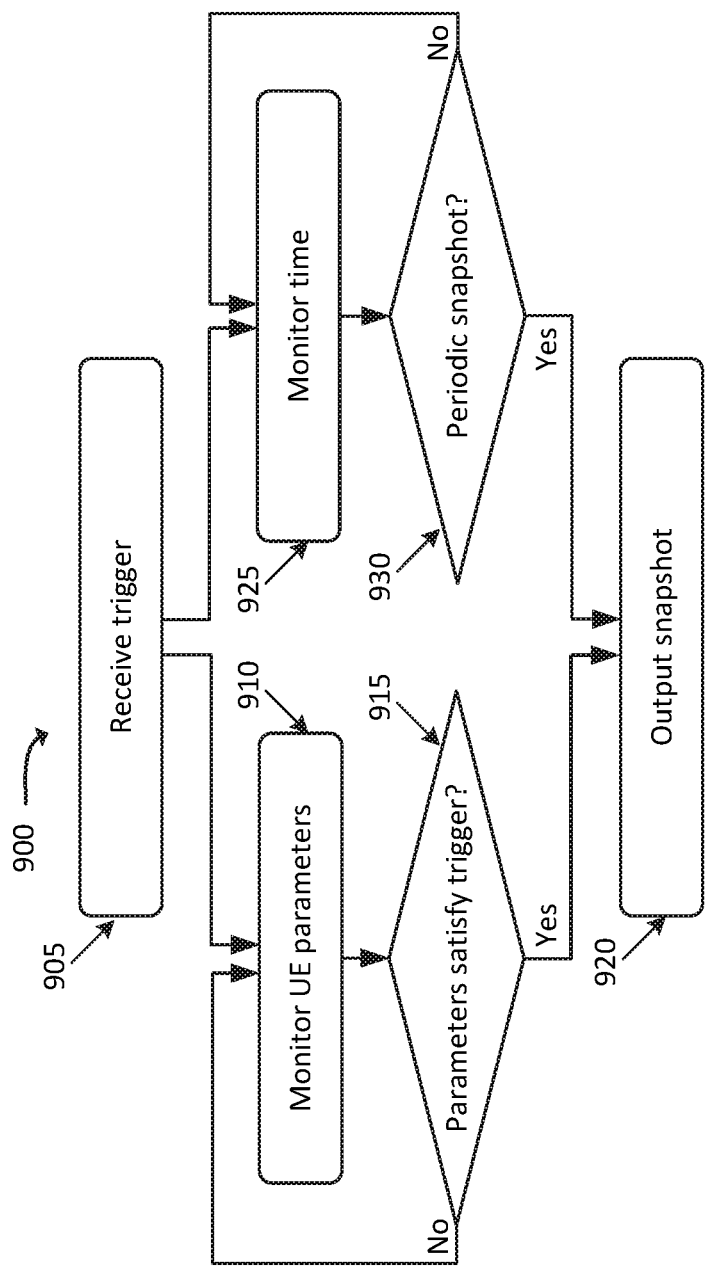
FIG. 9 illustrates an example process for periodically or intermittently outputting snapshots.

FIG. 9 illustrates an example process 900 for periodically and/or intermittently generating and/or outputting snapshots. In some embodiments, some or all of process 900 may be performed by UE 505.

As shown, process 900 may include receiving (at 905) one or more triggers. For example, UE 505 may receive a trigger from ITDS 510 (e.g., directly from ITDS 510 or via one or more other devices or systems). As discussed above, a trigger may specify one or more trouble markers associated with one or more trouble conditions. As described herein, the trigger may be used to proactively detect potential trouble conditions before they occur, so that they can be proactively addressed.

Process 900 may further include monitoring (at 910) UE parameters. For example, UE 505 may monitor parameters associated with UE 505, such as a list of installed and/or running applications, settings of UE 505, and/or other parameters (e.g., as similarly described above with respect to FIG. 6).

Process 900 may additionally include determining (at 915) if the parameters satisfy a particular trigger. For example, UE 505 may evaluate the monitored parameters against the trouble markers specified in the trigger(s) received at 905.

If the parameters do not satisfy any triggers (at 915—NO), then process 900 may include continuing to monitor (at 910) the UE parameters. If, on the other hand, the parameters satisfy a particular trigger (at 915—YES), then process 900 may include outputting (at 920) a snapshot. The snapshot may include a full list of parameters associated with UE 505 (e.g., a full set of parameters that UE 505 is configured to monitor, and/or that UE 505 has authorization from a user of UE 505 to report to ITDS 510). In some embodiments, the snapshot may include only a partial list of parameters (e.g., fewer than all parameters that UE 505 is configured to monitor, and/or that UE 505 has authorization from a user of UE 505 to report to ITDS 510). If the snapshot includes only a partial list of parameters, these parameters may be the parameters that satisfy the trigger(s) received at 905.

Process 900 may also include monitoring (at 925) the passage of time. For example, in embodiments where UE 505 is configured to generate and/or output a snapshot on a periodic basis (e.g., every 30 seconds, every minute, every hour, every day, etc.), UE 505 may maintain a timer or use some other suitable technique to monitor the passage of time. If it is determined (at 930—NO) that the periodic basis is not yet satisfied (e.g., if 47 seconds have passed since the last snapshot was outputted, and the periodic basis indicates that a snapshot should be outputted every minute), then process 900 may include continuing to monitor (at 925) the passage of time.

If, on the other hand, it is determined (at 930—YES) that the periodic basis has been satisfied, then process 900 may include outputting (at 920) a snapshot. In some embodiments, UE 505 may be configured to only periodically output snapshots (e.g., at 925, 930, and 925). In some embodiments, UE 505 may be configured to output snapshots only when a trigger is satisfied (e.g., at 910-920). In some embodiments, UE 505 may be configured to output snapshots both on a periodic basis and when a trigger is satisfied. In some such embodiments, UE 505 may restart the period for periodically outputting snapshots when outputting a snapshot based on the satisfaction of a trigger, while in some embodiments UE 505 may not restart the period for periodically outputting snapshots when outputting a snapshot based on the satisfaction of a trigger.

Figure 10:
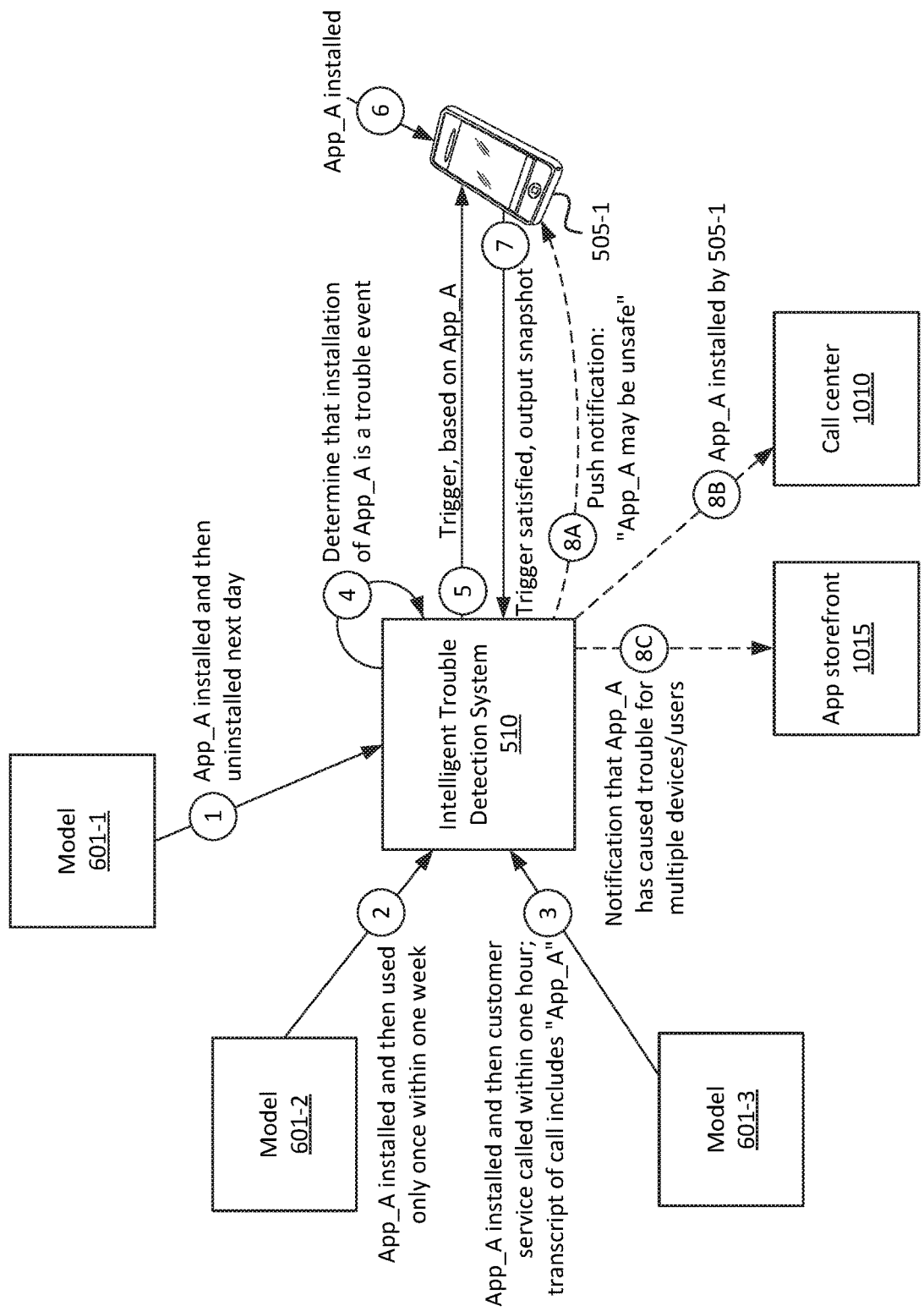
FIG. 10 illustrates an example scenario in which a trouble condition is identified and proactively remediated.

FIG. 10 illustrates an example scenario in which a trouble condition is identified and proactively remediated (e.g., in accordance with some or all of the processes discussed above). As shown, ITDS 510 may receive information regarding multiple models 601-1, 601-2, and 601-3. As discussed above, these models 601 may each be associated with a particular UE 505, and/or a particular set of UEs 505. Model 601-1 may include (at 1) information indicating that a particular application, "App_A," was installed and then was uninstalled the next day. Model 601-2 may include (at 2) information indicating that the same application was installed and used only once within one week of installation. Model 601-3 may include information indicating that App_A was installed and then customer service was called within one hour, and that a transcript of the call includes a mention of the name of the application.

While discussed above in the context of an application that may cause potential issues, transcripts of calls may be analyzed for mentions of other types of topics that may give rise to potential issues. Additionally, models 601 may be normalized and/or annotated (e.g., by ITDS 510 and/or some other system), such as by eliminating "stop" words in transcripts, such as "a," "the," "do," "or," "it," and so on, in order to more accurately determine a user's intent. Annotations may include categories, classifications, or the like that are based on the content of transcripts. For instance, using machine learning and/or other techniques, ITDS 510 may determine that a transcript that includes the words "help," "application," "just installed" may be categorized as a request for help with a recently installed application.

Based on the received models (e.g., based on the parameters enumerated immediately above with respect to arrows 1-3 of this figure), ITDS 510 may determine (at 4) that the installation of App_A is a common factor in the identified issues (e.g., the relatively fast uninstallation of the application, the low usage of the application, and/or the call to customer service mentioning the application). As such, ITDS 510 may generate and output (at 5) a trigger that identifies that the installation of App_A is a trouble marker. As an example, if a relatively large quantity or proportion of chat transcripts (e.g., from a large number of users and/or UEs 505) include the words "help," "application," "just installed," and snapshots corresponding to those UEs 505 (or models 601 generated based on the snapshots) indicate that App_A was installed at those UEs 505 one day, or less, prior to UEs 505 contacting customer support, then ITDS 510 may predict that if the application is installed at another UE 505, this other UE 505 may contact support for help with the application.

Assume, for instance, that UE 505-1 receives the trigger, and at some subsequent time, App_A is installed (at 6) at UE 505-1. UE 505-1 may determine that the trigger is satisfied, and may output (at 7) a snapshot to ITDS 510. When receiving the snapshot, ITDS 510 may analyze the snapshot and may determine that a potential trouble condition exists at UE 505-1 (e.g., that UE 505-1 has installed App_A, and thus may be likely to cause some condition that may degrade the user experience). In some embodiments, ITDS 510 may analyze one or more other snapshots previously or subsequently provided by UE 505-1, and/or one or more models 601 with which UE 505-1 is associated, in order to determine the presence of a trouble condition.

Once the trouble condition has been identified, ITDS 510 may take one or more remedial actions. For example, ITDS 510 may output (at 8A) a push notification to UE 505-1, indicating that App_A may be unsafe. This may allow a user of UE 505-1 to make an informed decision to uninstall App_A, or to allow App_A to remain installed. In some embodiments, ITDS 510 may notify (at 8B) a customer support call center 1010 that App_A has been installed by UE 505-1. This notification may include identification information of UE 505-1 (e.g., an MDN), so that if UE 505-1 subsequently calls call center 1010, call center 1010 may be prepared for the particular trouble condition. For example, a customer service representative at call center 1010 may be notified that UE 505-1 has installed App_A, and this may aid the representative in providing support for App_A without needing to ask preliminary questions.

Additionally, or alternatively, call center 1010 may include IVR menu functionality, in which callers may navigate through a menu through voice or speech commands. The IVR menu may be personalized based on the notification (at 8B) that UE 505-1 has installed App_A. For example, portions of the IVR menu may be skipped based on the notification and/or based on additional information associated with UE 505-1 (e.g., as obtained from user information repository 520). For instance, the IVR menu may normally begin with a prompt to press a given button to select a given language, from a set of languages. The information associated with UE 505-1 may be used to automatically select options in the IVR menu (e.g., automatically select the language based on a language indicated in user information obtained from user information repository 520, automatically select an option to provide support for an installed application based on the notification (at 8B) that UE 505-1 has installed App_A, etc.). In some embodiments, the IVR menu may be bypassed entirely, and the call may be forwarded to a live person and/or some other device or system based on the notification (at 8B).

In some embodiments, ITDS 510 may notify (at 8C) an app storefront 1015 that App_A has caused trouble for multiple devices and/or users (e.g., based on the information received from models 601-1, 601-2, and 601-3). App storefront 1015 may include one or more devices or systems that provide applications for download and may, based on the notification (at 8C), modify the presentation or availability of App_A. For example app storefront 1015 may present a notification to users who are accessing an information page for App_A that App_A may cause issues if downloaded. Additionally, or alternatively, app storefront 1015 may make App_A unavailable for download, based on the notification (at 8C). In some embodiments, ITDS 510 may take multiple remedial actions, such as two or more of the abovementioned actions (e.g., at 8A, 8B, and/or 8C), and/or may take one or more other remedial actions.

Figure 11:
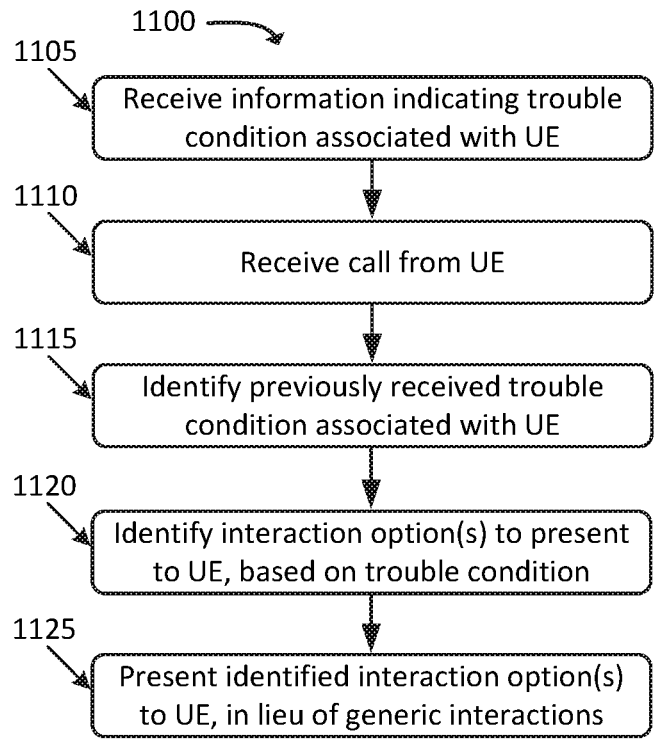
FIG. 11 illustrates an example process for proactively interacting with a user, regarding an identified trouble condition, by bypassing a generic IVR menu.

FIG. 11 illustrates an example process 1100 for proactively interacting with a user, regarding an identified trouble condition, by bypassing a generic IVR menu. In some embodiments, process 1100 may be performed by a device or system that presents an IVR menu to callers, such as call center 1010.

As shown, process 1100 may include receiving (at 1105) information indicating a trouble condition associated with a UE. For example, call center 1010 may receive a notification (e.g., similar to notification 8B, discussed above with respect to FIG. 10) that a particular UE 505 is experiencing a particular trouble condition. This notification may include identifying information for UE 505, such as an MDN and/or some other identifier that is suitable to uniquely identify UE 505 from other UEs.

Process 1100 may further include receiving (at 1110) a call from UE 505, and identifying (at 1115) the previously received trouble condition associated with UE 505. For example, when receiving the call, call center 1010 may identify an MDN associated with the caller, and identify that the MDN of the caller matches the MDN of UE 505, which was identified in the information (received at 1105). In some embodiments, based on receiving the information regarding the trouble condition and/or based on receiving the call from UE 505, call center 1010 may receive or obtain information associated with UE 505 or a user of UE 505 (e.g., from user information repository 520).

Process 1100 may additionally include identifying (at 1120) one or more interaction options to present to the UE, based on the trouble condition. For example, different types of trouble conditions may be associated with different types of interactions. Referring again to the example of an application that causes issues, call center 1010 may identify, as an interaction option, a pre-recorded tutorial on uninstalling the application. As another example, if the trouble condition is associated with a subscription or billing issue, the interaction option may include redirecting the call to a live agent in a subscription or billing department. In some embodiments, the interactions options may be identified further based on information (e.g., obtained or received from user information repository 520). For example, if the information from user information repository 520 includes a language preference, identifying the interaction options may include selecting the user's preferred language, in lieu of a default language, and/or in lieu of asking the user, during the call, which language the user prefers.

In some embodiments, the identified interaction option may include using a virtual agent to converse with the user (e.g., a programmatic system that uses natural language processing and/or some other technique to carry on a conversation). The virtual agent may be instantiated based on the identified trouble condition and/or information regarding the user or UE 505 received from user information repository 520. For example, assuming that the user's name is John and the trouble condition is the updating of an application named "App_A," the virtual agent may audibly speak a phrase, such as "Hello John. I see you have recently updated App_A. Is this what you're calling about?" The virtual agent may process voice responses (e.g., an audible "Yes" or "No") or other types of input (e.g., a keypress at UE 505 to denote the selection of a key on a keypad) to interact with the user. In some embodiments, the virtual agent may include text chat capabilities, in addition to, or in lieu of, voice-based capabilities. For example, in a graphical user interface, the virtual agent may provide textual messages (e.g., the phrase "Hello John. I see you have recently updated App_A. Is this what you're contacting support about?" may be displayed in the graphical user interface). Furthermore, the virtual agent may provide selectable options for predetermined responses (e.g., a selectable option for the user to indicate "yes" and/or a selectable option for the user to indicate "no"), and/or may process textual responses (e.g., a user entry of the words "yes" or "no" via a keypad, keyboard, and/or other input device).

Process 1100 may also include presenting (at 1125) the identified interaction option to the UE, in lieu of generic interactions. For example, in lieu of presenting a generic IVR menu, call center 1010 may present the identified interaction options (e.g., may bypass the IVR menu, and/or may pre-select IVR menu options in accordance with the identified interaction option). As another example, in lieu of presenting a generic IVR menu, a virtual agent may communicate with a user of UE 505 based on the identified trouble condition, information regarding UE 505 or the user of UE 505, etc. In this manner, a user calling call center 1010 may be provided with an enhanced user experience, by not requiring the user to spend time and effort interacting with an IVR menu and instead providing personalized support that is potentially of immediate relevance to the user. Further, the user experience may be enhanced by speaking with a natural language-based automated system that may have already predicted the subject of the user's call, thus saving the user additional time and effort.

Figure 12:
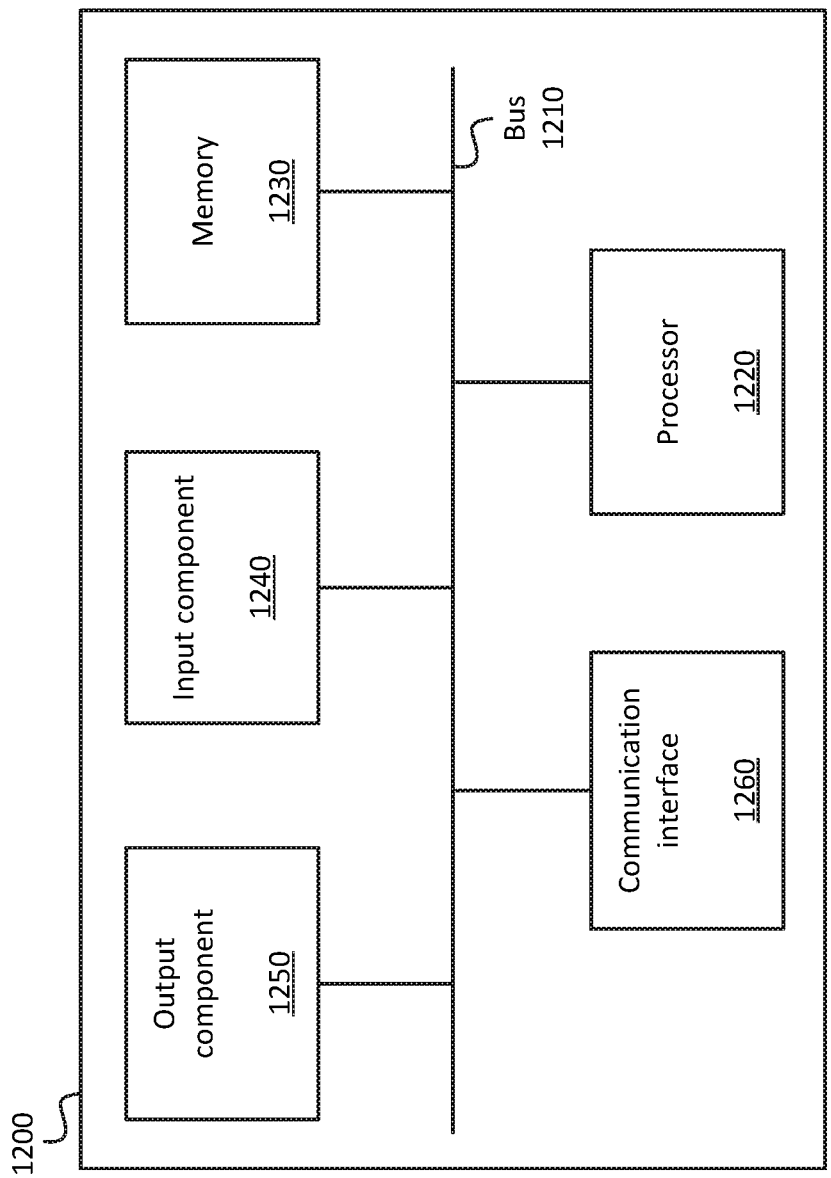
FIG. 12 illustrates example components of one or more devices, according to one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 1, 2, 3A, 3B, and 7-11, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the ten "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
a non-transitory computer-readable medium storing a set of processor-executable instructions; and
one or more processors configured to execute the set of processor-executable instructions, wherein executing the set of processor-executable instructions causes the one or more processors to:
receive a plurality of snapshots associated with a plurality of User Equipment ("UEs"), wherein each snapshot, of the plurality of snapshots, includes information describing attributes of a specific UE, of the plurality of UEs, at a particular time;
identify, based on the plurality of snapshots, one or more markers of a particular trouble condition associated with one or more UEs, of the plurality of UEs;
receive one or more snapshots associated with a particular UE, wherein the one or more snapshots each include information describing attributes of the particular UE at a respective time;
compare the attributes of the particular UE, as indicated by the one or more snapshots associated with the particular UE, to the identified one or more markers of the particular trouble condition;
determine, based on the comparing, that the particular UE is experiencing the trouble condition or is likely to experience the trouble condition; and
perform a remedial action based on the determination that the particular UE is experiencing the trouble condition or is likely to experience the trouble condition, the remedial action being performed without a request from the particular UE to perform the remedial action, wherein performing the remedial action includes:
identifying, based on the identified particular trouble condition, one or more particular selections of a menu associated with an interactive voice response ("IVR") system,
determining that a call has been received from the particular UE,
select, without user interaction via the particular UE, the one or more particular selections of the menu, and
present, to the particular UE and based on the received call, one or more menu options, associated with the IVR system, that are associated with the selection of the one or more particular selections of the menu.

2. The device of claim 1, wherein executing the processor-executable instructions, to perform the remedial action, further causes the one or more processors to:
determine an identifier associated with the particular UE; and
notify a customer support system that the particular UE is experiencing the trouble condition or is likely to experience the trouble condition, the notifying including providing the identifier associated with the particular UE to the customer support system.

3. The device of claim 1, wherein executing the processor-executable instructions, to perform the remedial action, further causes the one or more processors to:
present the one or more options, associated with the selection of the one or more particular selections of the menu, to the particular UE in lieu of presenting a generic IVR menu to the particular UE.

4. The device of claim 1, wherein executing the processor-executable instructions, to identify the one or more markers, further causes the one or more processors to identify the one or more markers using one or more machine learning techniques.

5. The device of claim 1, wherein executing the processor-executable instructions, to identify the one or more markers of the particular trouble condition associated with a first UE, of the one or more UEs, further causes the one or more processors to:
determine a difference between a first snapshot, associated with the first UE at a first time, and a second snapshot associated with the first UE at a second time.

6. The device of claim 1, wherein the attributes of the particular UE include at least one of:
a list of applications installed at the particular UE,
a status of a battery of the UE, or
a network connectivity status of the UE.

7. The device of claim 1, wherein executing the processor-executable instructions further causes the one or more processors to:
receive information describing attributes of another UE that is associated with a same user as the particular UE,
wherein the determination, that the particular UE is experiencing the trouble condition or is likely to experience the trouble condition, is further based on the information describing attributes of another UE that is associated with a same user as the particular UE.

8. A non-transitory computer-readable medium, storing a set of processor-executable instructions, which, when executed by one or more processors, cause the one or more processors to:
receive a plurality of snapshots associated with a plurality of User Equipment ("UEs"), wherein each snapshot, of the plurality of snapshots, includes information describing attributes of a specific UE, of the plurality of UEs, at a particular time;
identify, based on the plurality of snapshots, one or more markers of a particular trouble condition associated with one or more UEs, of the plurality of UEs;
receive one or more snapshots associated with a particular UE, wherein the one or more snapshots each include information describing attributes of the particular UE at a respective time;
compare the attributes of the particular UE, as indicated by the one or more snapshots associated with the particular UE, to the identified one or more markers of the particular trouble condition;
determine, based on the comparing, that the particular UE is experiencing the trouble condition or is likely to experience the trouble condition; and
perform a remedial action based on the determination that the particular UE is experiencing the trouble condition or is likely to experience the trouble condition, the remedial action being performed without a request from the particular UE to perform the remedial action, wherein performing the remedial action includes:

identifying, based on the identified particular trouble condition, one or more particular selections of a menu associated with an interactive voice response ("IVR") system, determining that a call has been received from the particular UE, select, without user interaction via the particular UE, the one or more particular selections of the menu, and present, to the particular UE and based on the received call, one or more menu options, associated with the IVR system, that are associated with the selection of the one or more particular selections of the menu.

9. The non-transitory computer-readable medium of claim 8, wherein the processor-executable instructions, to perform the remedial action, further include processor-executable instructions to:

determine an identifier associated with the particular UE; and notify a customer support system that the particular UE is experiencing the trouble condition or is likely to experience the trouble condition, the notifying including providing the identifier associated with the particular UE to the customer support system.

10. The non-transitory computer-readable medium of claim 8, wherein the processor-executable instructions, to perform the remedial action, further include processor-executable instructions to:

present the one or more options, associated with the selection of the one or more particular selections of the IVR menu, to the particular UE in lieu of presenting a generic IVR menu to the particular UE.

11. The non-transitory computer-readable medium of claim 8, wherein the processor-executable instructions, to identify the one or more markers, further include processor-executable instructions to identify the one or more markers using one or more machine learning techniques.

12. The non-transitory computer-readable medium of claim 8, wherein the processor-executable instructions, to identify the one or more markers of the particular trouble condition associated with a first UE, of the one or more UEs, further include processor-executable instructions to:

determine a difference between a first snapshot, associated with the first UE at a first time, and a second snapshot associated with the first UE at a second time.

13. The non-transitory computer-readable medium of claim 8, wherein the attributes of the particular UE include at least one of:

a list of applications installed at the particular UE,
a status of a battery of the UE, or
a network connectivity status of the UE.

14. The non-transitory computer-readable medium of claim 8, wherein the set of processor-executable instructions further includes processor-executable instructions to:

receive information describing attributes of another UE that is associated with a same user as the particular UE, wherein the determination, that the particular UE is experiencing the trouble condition or is likely to experience the trouble condition, is further based on the information describing attributes of another UE that is associated with a same user as the particular UE.

15. A method, comprising:

receiving, by a device, a plurality of snapshots associated with a plurality of User Equipment ("UEs"), wherein each snapshot, of the plurality of snapshots, includes information describing attributes of a specific UE, of the plurality of UEs, at a particular time;

identifying, by the device and based on the plurality of snapshots, one or more markers of a particular trouble condition associated with one or more UEs, of the plurality of UEs;

receiving, by the device, one or more snapshots associated with a particular UE, wherein the one or more snapshots each include information describing attributes of the particular UE at a respective time;

comparing, by the device, the attributes of the particular UE, as indicated by the one or more snapshots associated with the particular UE, to the identified one or more markers of the particular trouble condition;

determining, by the device and based on the comparing, that the particular UE is experiencing the trouble condition or is likely to experience the trouble condition; and performing, by the device, a remedial action based on the determination that the particular UE is experiencing the trouble condition or is likely to experience the trouble condition, the remedial action being performed without a request from the particular UE to perform the remedial action, wherein performing the remedial action includes:

identifying, based on the identified particular trouble condition, one or more particular selections of a menu associated with an interactive voice response ("IVR") system, determining that a call has been received from the particular UE, select, without user interaction via the particular UE, the one or more particular selections of the menu, and present, to the particular UE and based on the received call, one or more menu options, associated with the IVR system, that are associated with the selection of the one or more particular selections of the menu.

16. The method of claim 15, wherein performing the remedial action further includes:

determining an identifier associated with the particular UE; and notifying a customer support system that the particular UE is experiencing the trouble condition or is likely to experience the trouble condition, the notifying including providing the identifier associated with the particular UE to the customer support system.

17. The method of claim 15, wherein performing the remedial action further includes:

presenting the one or more options, associated with the selection of the one or more particular selections of the IVR menu, to the particular UE in lieu of presenting a generic IVR menu to the particular UE.

18. The method of claim 15, wherein identifying the one or more markers further includes identifying the one or more markers using one or more machine learning techniques.

19. The method of claim 15, wherein identifying the one or more markers of the particular trouble condition associated with a first UE, of the one or more UEs, further includes:

determining a difference between a first snapshot, associated with the first UE at a first time, and a second snapshot associated with the first UE at a second time.

20. The method of claim 15, wherein the attributes of the particular UE include:

a list of applications installed at the particular UE,
a status of a battery of the UE, and
a network connectivity status of the UE.

* * * * *